US012496513B2

(12) United States Patent
Agrawal et al.

(10) Patent No.: US 12,496,513 B2
(45) Date of Patent: Dec. 16, 2025

(54) TOUCH SCREEN DISPLAY GAME CONTROLLER CUSTOMIZED PER GAME APPLICATION IN RESPONSE TO CONTROL USAGE

(71) Applicant: MOTOROLA MOBILITY LLC, Wilmington, DE (US)

(72) Inventors: Amit Kumar Agrawal, Bangalore (IN); Pankaj Kushwaha, Bengaluru (IN); Satyabrata Rout, Bhubaneswar (IN); Amarnath J, Bhelka (IN)

(73) Assignee: Motorola Mobility LLC, Chicago, IL (US)

( * ) Notice: Subject to any disclaimer, the term of this patent is extended or adjusted under 35 U.S.C. 154(b) by 240 days.

(21) Appl. No.: 18/186,012

(22) Filed: Mar. 17, 2023

(65) Prior Publication Data

US 2024/0307762 A1 Sep. 19, 2024

(51) Int. Cl.

*A63F 13/23* (2014.01)
*A63F 13/2145* (2014.01)
*A63F 13/22* (2014.01)
*A63F 13/26* (2014.01)
*G06F 3/04886* (2022.01)

(52) U.S. Cl.

CPC .......... *A63F 13/23* (2014.09); *A63F 13/2145* (2014.09); *A63F 13/22* (2014.09); *A63F 13/26* (2014.09); *G06F 3/04886* (2013.01)

(58) Field of Classification Search

CPC ...... A63F 13/20; A63F 13/2145; A63F 13/22; A63F 13/23; A63F 13/25; A63F 13/26; A63F 13/30; A63F 13/40; A63F 13/42; A63F 13/426; A63F 13/45; A63F 13/50; A63F 13/52; A63F 13/70

See application file for complete search history.

(56) References Cited

U.S. PATENT DOCUMENTS

| | | | | |
|---|---|---|---|---|
| 9,257,005 | B2 | 2/2016 | Nicely | |
| 9,764,227 | B1 * | 9/2017 | Harrington | A63F 13/79 |
| 10,013,623 | B2 | 7/2018 | Walker et al. | |
| 10,410,241 | B1 | 9/2019 | Burcham et al. | |
| 11,169,831 | B1 | 11/2021 | Semenov et al. | |
| 11,334,178 | B1 * | 5/2022 | Marggraff | G09B 5/02 |
| 11,904,240 | B2 * | 2/2024 | Harrington | A63F 13/50 |

(Continued)

*Primary Examiner* — Omkar A Deodhar

(74) *Attorney, Agent, or Firm* — Isidore PLLC

(57) ABSTRACT

An electronic device, method, and computer program product support automatically modifying a virtual gamepad presented on a mobile electronic device based on frequency of use of particular controls for a game. The electronic device executes a game application to present, via an external display, a game screen. The electronic device identifies a virtual gamepad configuration having virtual controls including at least first and second virtual controls. The electronic device presents the virtual gamepad configuration on a touch screen display. The electronic device monitors frequency of input to each of the virtual controls. The electronic device defines a second virtual gamepad configuration associated with the game application that spatially adjusts at least one of the first and the second virtual controls in relation to a respective frequency of input to facilitate use of the touch screen display as a game controller to control the game application.

18 Claims, 10 Drawing Sheets

(56) References Cited

U.S. PATENT DOCUMENTS

| | | | | |
|---|---|---|---|---|
| 2011/0009195 | A1* | 1/2011 | Porwal | A63F 13/533<br>463/37 |
| 2012/0142429 | A1 | 6/2012 | Muller | |
| 2013/0130791 | A1 | 5/2013 | Myogan | |
| 2013/0187894 | A1 | 7/2013 | Ladouceur et al. | |
| 2013/0314331 | A1 | 11/2013 | Rydenhag et al. | |
| 2014/0080428 | A1 | 3/2014 | Rhoads et al. | |
| 2014/0247266 | A1 | 9/2014 | Young | |
| 2015/0182856 | A1* | 7/2015 | Mays, III | G06F 3/0488<br>463/31 |
| 2015/0195356 | A1 | 7/2015 | Kim et al. | |
| 2015/0355715 | A1 | 12/2015 | Smith | |
| 2016/0089600 | A1* | 3/2016 | Mays, III | A63F 13/22<br>463/31 |
| 2016/0291731 | A1 | 10/2016 | Liu et al. | |
| 2017/0068952 | A1 | 3/2017 | Brockmann | |
| 2017/0300560 | A1 | 10/2017 | Nugent | |
| 2019/0262723 | A1 | 8/2019 | Trombetta et al. | |
| 2019/0295064 | A1 | 9/2019 | Malo | |
| 2020/0067786 | A1 | 2/2020 | Ricci | |
| 2020/0101382 | A1 | 4/2020 | Wheeler et al. | |
| 2021/0200393 | A1 | 7/2021 | Wohlstadter et al. | |
| 2022/0164789 | A1 | 5/2022 | Gosalia | |
| 2023/0326108 | A1 | 10/2023 | Etwaru et al. | |
| 2024/0354735 | A1 | 10/2024 | Kell | |
| 2025/0018294 | A1 | 1/2025 | Li et al. | |

* cited by examiner

TOUCH SCREEN DISPLAY GAME CONTROLLER CUSTOMIZED PER GAME APPLICATION IN RESPONSE TO CONTROL USAGE

CROSS REFERENCE TO RELATED APPLICATIONS

The present application is related to commonly owned U.S. patent application Ser. No. 18/186,038, filed on even date herewith to the same named inventors and entitled "Network Shared Customization of Touch Screen Display Game Controller Customized Based on Tracking User Inputs," the disclosure of which is hereby incorporated by reference in its entirety.

BACKGROUND

1. Technical Field

The present disclosure relates generally to communication devices that have a touch screen display, and in particular to communication devices that can concurrently present different content on an internal touch screen display and an external display.

2. Description of the Related Art

User communication devices may be sized for mobility, enabling users to engage in audio as well as video communication sessions in nearly any location. Within a small handheld form factor, communication devices present sensors and output devices that can be used as a traditional phone handset with a speaker positioned to be used as an earpiece and a microphone positioned to capture audio inputs as spoken by a user. Some communication devices such as smartphones have become multi-functional devices as the designs have increasingly incorporated a large number of capabilities. In an example, rather than being limited to manually actuated control keys and buttons, touch screen displays are configurable to present visual content and graphical controls in support of many types of applications in addition to user communication sessions.

In a related technology, game consoles are widely used, combining a large display monitor for an immersive experience with a physical gamepad controller that is ergonomically configured for two-handed use while looking at the monitor. When unable to use a stationary game console, gamers increasingly use mobile gaming even though the small screen and lack of ergonomic game controls limits the gaming experience. To better approximate playing on a game console, mobile communication devices are being configured to present a virtual gamepad controller while presenting a game screen on a larger external display monitor. Physical gamepad controllers have many manual controls such as buttons, joypad, and joysticks. To create a virtual gamepad, virtual controls are crowded onto the virtual gamepad presented on the mobile communication device to provide equivalent functionality.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
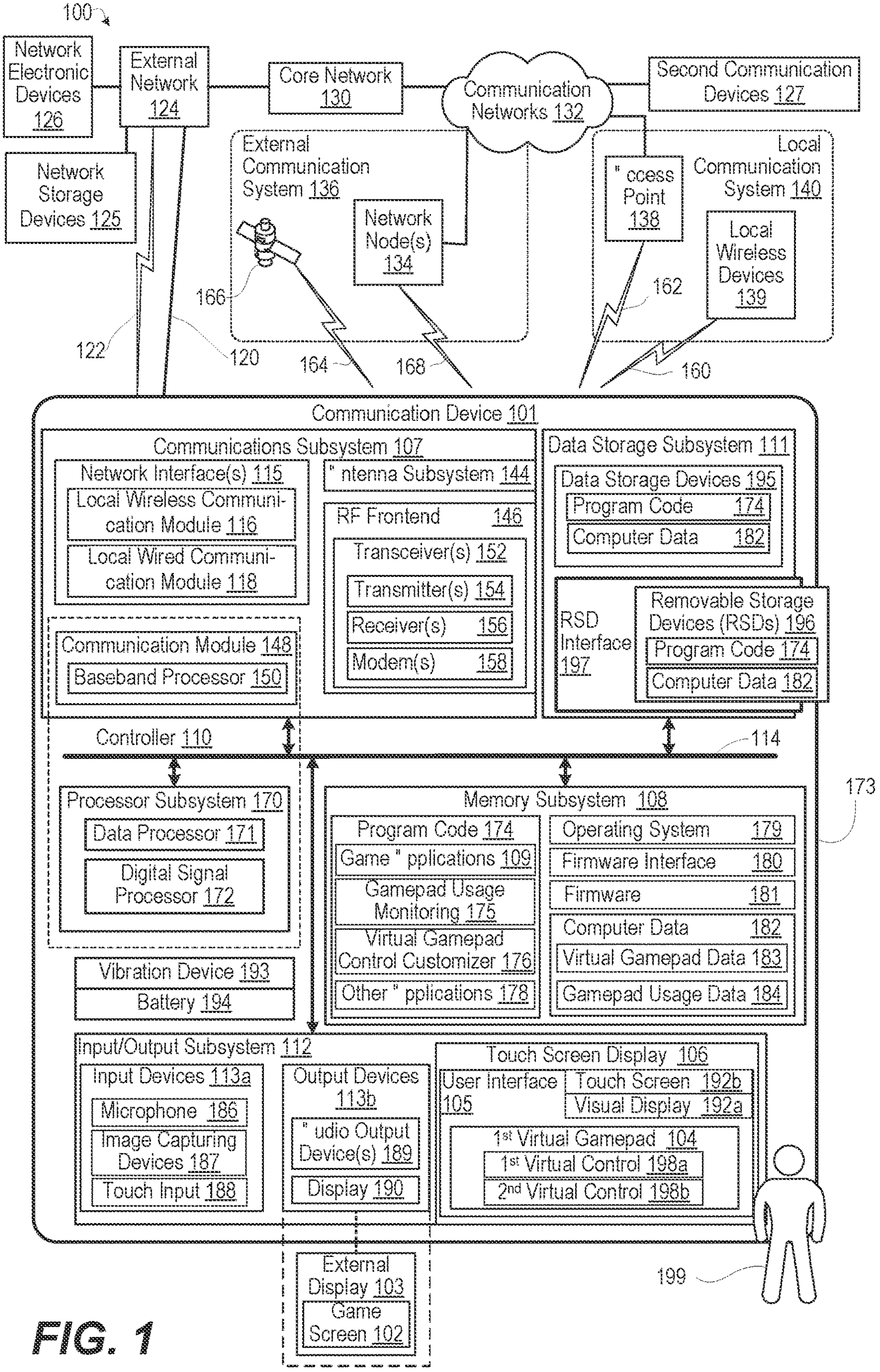
FIG. 1 depicts a functional block diagram of a communication environment including a communication device that supports mobile gaming by presenting a game screen on an external display while presenting a virtual gamepad on a touch screen display, according to one or more embodiments.

According to one or more first aspects of the present disclosure, an electronic device, a method, and a computer program product support mobile gaming by presenting a game screen on an external display while presenting a virtual gamepad on a touch screen display of the electronic device. The virtual gamepad may present soft controls that represent all of the hard controls on a physical gamepad controller. According to aspects of the present disclosure, a virtual gamepad may be customized based on just the controls used for a particular game, providing a more ergonomic layout to improve the gaming experience. In an example, the customization may be based on usage by a particular gamer. In another example, the customization may be based on usage by other gamers of comparable skill levels. The customization can include changing one or more of a size, a shape, and/or a position of soft controls based on the frequency of use. Certain soft controls may be hidden to provide additional space to frequently used soft controls and/or to avoid inadvertent selection. The customization may be specific to one or more of a category of game (e.g., racing, shooter, adventure, multiplayer battle, etc.), a specific game, a particular gamer, a selected physical gamepad controller or game console, and/or a skill level of a gamer. A learning module with crowdsourcing capabilities may implement customization at the electronic device or at a gaming network system supporting a population of electronic devices used for mobile gaming.

According to one or more second aspects of the present disclosure, a method performed by a network device includes aggregating usage data of physical and virtual gamepads for creating and distributing customized virtual gamepads based on the usage data. In one or more embodiments, a network system includes a communications subsystem that enables the network system to connect to a communication network. The network system includes network memory. A controller of the network system is communicatively connected to the communications subsystem and the network memory. The controller associates a first game application with a first virtual gamepad configuration including one or more virtual controls. The controller stores, in the network memory, one or more customized versions of the first virtual gamepad configuration including a second virtual gamepad configuration having one or more virtual controls that is at least one of different in size and/or spatially repositioned based on frequency of use of the one or more virtual controls during detected interactions with the first game application at one or more user devices. The controller transmits, via the communications subsystem and the communication network, at least one of the first and the second virtual gamepad configurations to a first electronic device for presenting on a touch screen display while executing the first game application and presenting a game screen on an external display.

In one or more embodiments, the electronic device includes a communications subsystem (e.g., peripheral cable, network interface, cellular connection, wireless connection) that enables the electronic device to connect to an external display. The electronic device includes a touch screen display and a memory storing a first game application. A controller of the electronic device is communicatively connected to the external display, the touch screen display, and the memory. The controller executes the first game application to present, via the external display, a game screen. The controller identifies a first virtual gamepad configuration of two or more virtual controls including at least a first virtual control and a second virtual control. The controller presents the first virtual gamepad configuration on the touch screen display. The controller monitors frequency of input to each of the two or more virtual controls. The controller defines a second virtual gamepad configuration associated with the first game application that spatially adjusts at least one of the first and the second virtual controls in relation to a respective frequency of input to facilitate use of the touch screen device as a game controller to control the first game application.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of a communication environment 100 that includes an electronic device, which is referenced herein as communication device 101 and in which the features of the present disclosure are advantageously implemented. In particular, communication device

101 supports mobile gaming by presenting game screen 102 on external display 103 while presenting first virtual gamepad 104 on user interface 105 of touch screen display 106. Communication device 101 includes communications subsystem 107 that enables communication device 101 to connect to external display 103. Communication device 101 includes memory subsystem 108 storing game application 109. Controller 110 of communication device 101 is communicatively connected to external display 103, touch screen display 106, and memory subsystem 108.

Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communications subsystem 107, memory subsystem 108, and controller 110, communication device 101 includes data storage subsystem 111 input/output (I/O) subsystem 112 having input devices 113*a* and output devices 113*b*. To enable management by controller 110, system interlink 114 communicatively connects controller 110 with communications subsystem 107, memory subsystem 108, data storage subsystem 111, and input/output subsystem 112. System interlink 114 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 114) are illustrated in FIG. 1, it is to be understood that more, fewer, or different interconnections may be present in other embodiments.

In one or more embodiments, communications subsystem 107 may include one or more network interfaces 115, such as local wireless communication module 116 and local wired communication module 118, to communicatively couple communication device 101 via network cable 120 or wireless connection 122 to external networks 124. Communication device 101, via external networks 124, may connect to network storage devices 125 that store computer data and to network devices 126 such as network servers that facilitate access to network storage device 125. Network electronic devices 126 may have identical or similar components and functionality as described above for communication device 101. Communication device 101 may communicate with second communication devices 127 via external network 124 or via communication networks 132 that are supported by core networks 130. Network interface(s) 115 may include a network interface controller (NIC) and support one or more network communication protocols. External network 124 can be a local area network (LAN), a campus area network (CAN), a metropolitan area network (MAN), or a wide area network (WAN). For example, network cable 120 and wireless connection 122 can be an Ethernet connection/cable.

In one or more embodiments, communications subsystem 107 may include additional functionality for communicating, using a cellular connection, with network node(s) 134 of external communication system 136 and for communicating, using a wireless connection, with wireless access point 138 or local wireless devices 139 of local communication system 140. Communications subsystem 107 includes antenna subsystem 144. Communications subsystem 107 includes radio frequency (RF) front end 146 and communication module 148 having baseband processor 150. RF front end 146 includes transceiver(s) 152, which includes transmitter(s) 154 and receiver(s) 156. RF front end 146 further includes modem(s) 158. Baseband processor 150 of communication module 148 communicates with controller 110 and RF front end 146. Baseband processor 150 operates in a baseband frequency range to encode data for transmission and decode received data, according to a communication protocol. Modem(s) 158 modulates baseband encoded data from communication module 148 onto a carrier signal to provide a transmit signal that is amplified by transmitter(s) 154. Modem(s) 158 demodulates each signal received using antenna subsystem 144 from external communication system 136 or local communication system 140. The received signal is amplified and filtered by receiver(s) 156, which demodulates received encoded data from a received carrier signal.

In one or more embodiments, controller 110, via communications subsystem 107, performs multiple types of cellular over-the-air (OTA) or wireless communication with local communication system 140. Communications subsystem 107 can communicate via an OTA connection 160 with local wireless devices 139. In an example, OTA connection 160 is a Bluetooth connection, or other personal access network (PAN) connection. In one or more embodiments, communications subsystem 107 communicates with one or more locally networked devices via a wireless local area network (WLAN) link 162 supported by access point 138. In one or more embodiments, access point 138 supports communication using one or more IEEE 802.11 WLAN protocols. Access point 138 is connected to communication networks 132 via a cellular or wired connection. In one or more embodiments, communications subsystem 107 receives downlink channels 164 from GPS satellites 166 to obtain geospatial location information. Communications subsystem 107 can communicate via an over-the-air (OTA) cellular connection 168 with network node(s) 134.

Controller 110 includes processor subsystem 170, which includes one or more central processing units (CPUs), depicted as data processor 171. Processor subsystem 170 can include one or more digital signal processors 172 that can be integrated with data processor 171. Processor subsystem 170 can include other processors that are communicatively coupled to data processor 171, such as baseband processors 150 of communication module 148. In one or more embodiments that are not depicted, controller 110 can further include distributed processing and control components that are external to housing 173 or grouped with other components, such as I/O subsystem 112. Data processor 171 is communicatively coupled, via system interlink 114, to memory subsystem 108. In one or more embodiments, data processor 171 is communicatively coupled via system interlink 114 to communications subsystem 107, data storage subsystem 111 and I/O subsystem 112. Controller 110 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 108 stores program code 174 for execution by processor subsystem 170 to provide the functionality described herein. Program code 174 includes applications such as game applications 109, gamepad usage monitoring application 175, virtual gamepad customizer application 176, and other applications 178. In one or more embodiments, several of the described aspects of the present disclosure are provided via executable program code of applications executed by controller 110. In one or more embodiments, program code 174 may be integrated into a distinct chipset or hardware module as firmware that operates separately from executable program code. Portions of program code 174 may be incorporated into different hardware components that operate in a distributed or collaborative manner. Implementation of program code 174 may use any known mechanism or process for doing so using integrated hardware and/or software, as known by those skilled in the art. Memory subsystem 108 further includes operating system (OS) 179, firmware interface 180, such as basic input/output system (BIOS) or Uniform Extensible Firmware Interface (UEFI), and firmware 181.

Memory subsystem 108 includes computer data 182 such virtual gamepad configuration data 183 used by game application 109 and gamepad usage data 184 used by virtual gamepad customizer application 176. Computer data 182 may incorporate "data" that originated as raw, real-world "analog" information that consists of basic facts and figures. Computer data 182 includes different forms of data, such as numerical data, images, coding, notes, and financial data. The computer data may originate at communication device 101 or be retrieved by communication device 101. Communication device 101 may store, modify, present, or transmit computer data 182. Computer data may be organized in one of a number of different data structures. Common examples of computer data 182 include video, graphics, text, and images as discussed herein. Computer data 182 can also be in other forms of flat files, databases, and other data structures.

I/O subsystem 112 includes input devices 113*a* and output devices 113*b*. Input devices 113*a* may include microphone 186, image capturing devices 187, and touch input devices 188 (e.g., keys and buttons). Output devices 113*b* may include audio output devices 189 and internal display 190 and/or external display 103 that may not detect touch inputs. I/O subsystem 112 may include haptic or tactile output devices such as vibration device 193 that oscillates a mass such as battery 194 to create vibratory alerts. Touch screen display 106 provides user interface 105 having visual display layer 192*a* as input device 113*a* below touch screen 192*b* as output device 113*b*.

Data storage subsystem 111 of communication device 101 includes data storage device(s) 195. Controller 110 is communicatively connected, via system interlink 114, to data storage device(s) 195. Data storage subsystem 111 provides program code 174 and computer data 182 stored on nonvolatile storage that is accessible by controller 110. For example, data storage subsystem 111 can provide a selection of computer data 182 and applications, such as game applications 109, gamepad usage monitoring application 175, virtual gamepad customizer application 176, and other applications 178. These applications can be loaded into memory subsystem 108 for execution/processing by controller 110. In one or more embodiments, data storage device(s) 195 can include hard disk drives (HDDs), optical disk drives, and/or solid-state drives (SSDs), etc. Data storage subsystem 111 of communication device 101 can include removable storage device(s) (RSD(s)) 196, which is received in RSD interface 197. Controller 110 is communicatively connected to RSD 196, via system interlink 114 and RSD interface 197. In one or more embodiments, RSD 196 is a non-transitory computer program product or computer readable storage device. Controller 110 can access data storage device(s) 195 or RSD 196 to provision communication device 101 with program code, such as program code 174 for game applications 109, gamepad usage monitoring application 175, virtual gamepad customizer application 176, and other applications 178, and with computer data 182, such as virtual gamepad configuration data 183 and gamepad usage data 184.

According to aspects of the present disclosure, controller 110 executes a first game application of the one or more game applications 109 to present, via external display 103, game screen 102. Controller 110 identifies a first virtual gamepad configuration in virtual gamepad data 183 having two or more virtual controls comprising at least first virtual control and second virtual control 198*a* and 198*b*. Controller 110 presents the first virtual gamepad configuration as first virtual gamepad 104 on touch screen display 106. Controller 110 monitors frequency of input by first user 199 to each of the two or more virtual controls, including at least first virtual control and second virtual control 198*a* and 198*b*. Controller 110 defines a second virtual gamepad configuration associated with the first game application that spatially adjusts at least one of first and second virtual controls 198*a* and 198*b* in relation to a respective frequency of input to facilitate use of touch screen 192 as a game controller to control the first game application.

Figure 2:
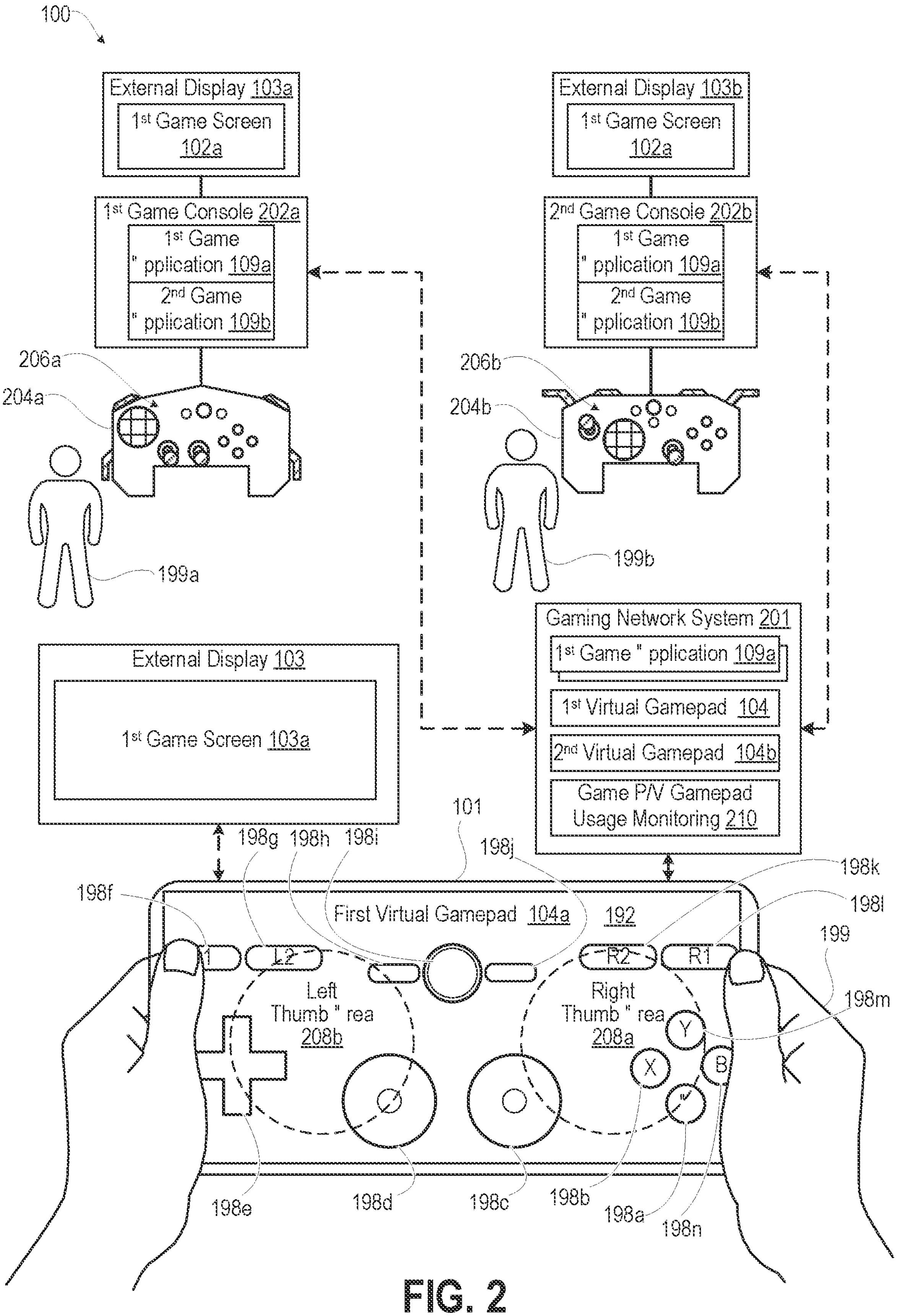
FIG. 2 depicts the communication environment including a gaming network system in communication with gaming consoles and the electronic device of FIG. 1 that presents a first virtual gamepad that imitates all controls of a first physical gamepad controller, according to one or more embodiments.

FIG. 2 depicts communication environment 100 including gaming network system 201 in communication with first and second gaming consoles 202*a* and 202*b* and communication device 101. First gaming console 202*a* is provisioned by gaming network system 201 with first game application 109*a* and second game application 109*b*. First physical gamepad controller 204*a* has first physical game controls 206*a* (e.g., joysticks, joypads, buttons, bumpers, triggers, etc.) in a first gamepad physical layout. Second user 199*a* uses first physical gamepad controller 204*a* to interact with first game console 202*a*. First game console 202*a* is executing first game application 109*a* and presenting first game screen 102*a* on second external display 103*a*. Similarly, second gaming console 202*b* is provisioned by gaming network system 201 with first game application 109*a* and second game application 109*b*. Second physical gamepad controller 204*b* has second physical game controls 206*b* (e.g., joysticks, joypads, buttons, bumpers, triggers, etc.) in a second gamepad physical layout. Third user 199*b* uses second physical gamepad controller 204*b* to interact with game console 202*b*. Second game console 202*b* is executing first game application 109*a* and presenting first game screen 102*a* on third external display 103*b*.

Gaming network system 201 may have a distributed computing architecture such as a cloud service that includes more than one network storage device 125 and more than one network communication device 126 (FIG. 2). Gaming network system 201 stores and distributes first and second game applications 109*a* and 109*b*. Gaming network system 201 may store and distribute one or more virtual gamepads 104 and 104*a*, such as to communication device 101 that is performing mobile gaming and presenting first game screen 102*a* on external display 103. In an example, first user 199 is familiar with first physical gamepad controller 204*a* and selects to use corresponding first virtual gamepad 104*a* that simulates the full functionality of first physical game controls 206*a*. Depending on the size of communication device 101 and preferences of first user 199, areas of user interface 105 are easier to touch, such as right and left thumb areas 208*a* and 208*b*. Virtual controls 198*a*-198*m* may be outside of the right and left thumb areas 208*a* and 208*b* and may be of small size and closely positioned, reducing ergonomic efficiency by forcing the user to view and carefully and slowly position fingers to select.

Depending on the game being played, certain virtual controls 198*a*-198*m* are used with differing frequencies, from being frequently used to not being used at all. Communication device 101 may track usage data in order to use that data for modifying first virtual gamepad 104. In one or more embodiments, gaming network system 201 may execute a game physical/visual gamepad usage monitoring application 210 to aggregate usage reported by first and second gaming consoles 202*a* and 202*b* and communication device 101. Gaming network system 201 may modify first virtual gamepad 104 to create second virtual gamepad 104*a* for distributing to electronic devices. In one or more embodiments, Gaming network system 201 may associate and rank virtual gamepads 104 and 104*a* as being appropriate for a particular game, skill level of a user, and familiarity of the user with a particular game console.

Figure 3:
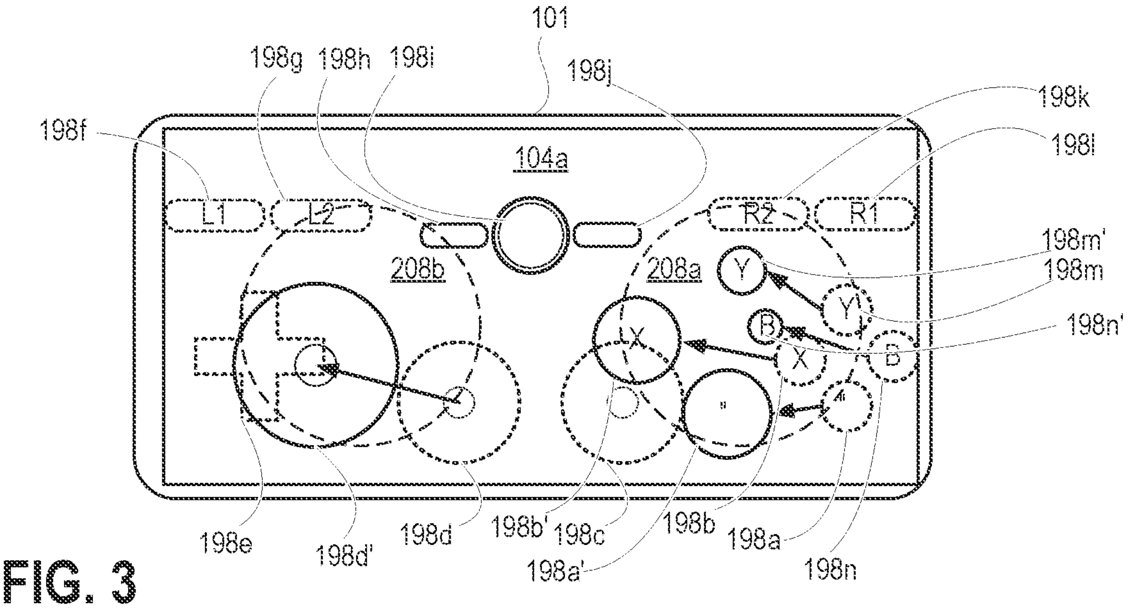
FIG. 3 depicts the electronic device of FIG. 2 presenting the first virtual gamepad and annotated with modifications proposed for ergonomic efficiencies customized for usage for a first game, according to one or more embodiments.

FIG. 3 depicts communication device 101 presenting second virtual gamepad 104*a* annotated with certain controls of first virtual gamepad 104 (FIG. 2; presented in phantom) that are modified or customized for ergonomic efficiencies customized for usage for first game application 109*a* for first user 199 (FIG. 2). In an example, virtual controls 198*h*, 198*i* and 198*j* are unmodified, having the same size, position and relative spacing. Virtual controls 198*c*, 198*e*, 198*f*, 198*g*, 198*k*, and 198/from first virtual gamepad 104 are omitted from second virtual gamepad 104*a*. Virtual controls 198*a*, 198*b*, 198*d*, 198*m*, and 198*n* of first virtual gamepad 104 (FIG. 2) are modified or customized in one or more of size, position and relative spacing to provide case of use and substantially reduce the likelihood of inadvertently missing the intended virtual control. In an example, Virtual controls 198*a*' and 198*b*' are increased in size and moved into right thumb area 208*a*. Virtual controls 198*m*' and 198*m*' are moved into right thumb area 208*a* with the former being unchanged in size and the latter being reduced in size.

Figure 4:
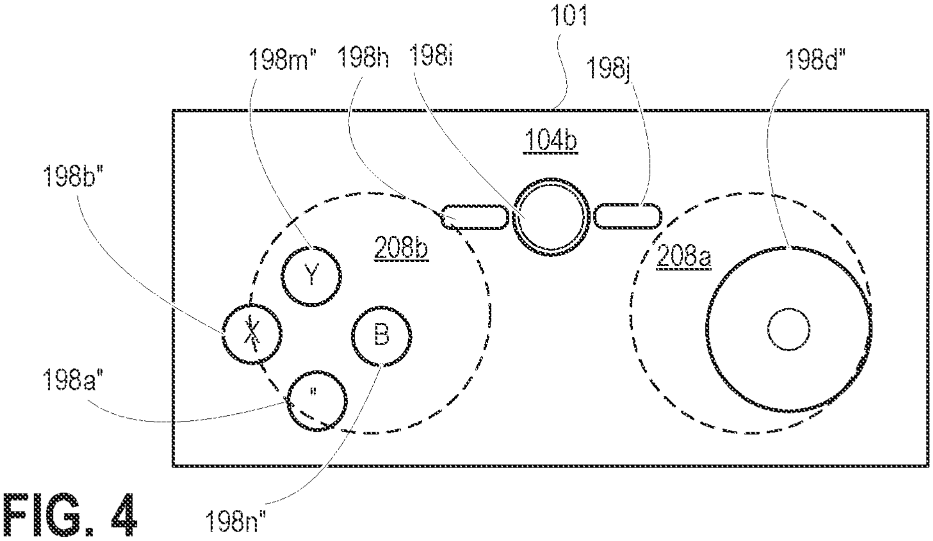
FIG. 4 depicts a second virtual gamepad customized for usage on the electronic device by a left-handed user, according to one or more embodiments.

FIG. 4 depicts a second virtual gamepad 104*b* customized for usage on communication device 101 by a left-handed user. Virtual controls 198*a*, 198*b*, 198*m*, and 198*n* of first virtual gamepad 104 (FIG. 2) are moved from right thumb area 208*a* to left thumb area 208*b*. Virtual control 198*d* of first virtual gamepad 104 (FIG. 2) is moved from left thumb area 208*b* to right thumb area 208*a*.

Figure 5:
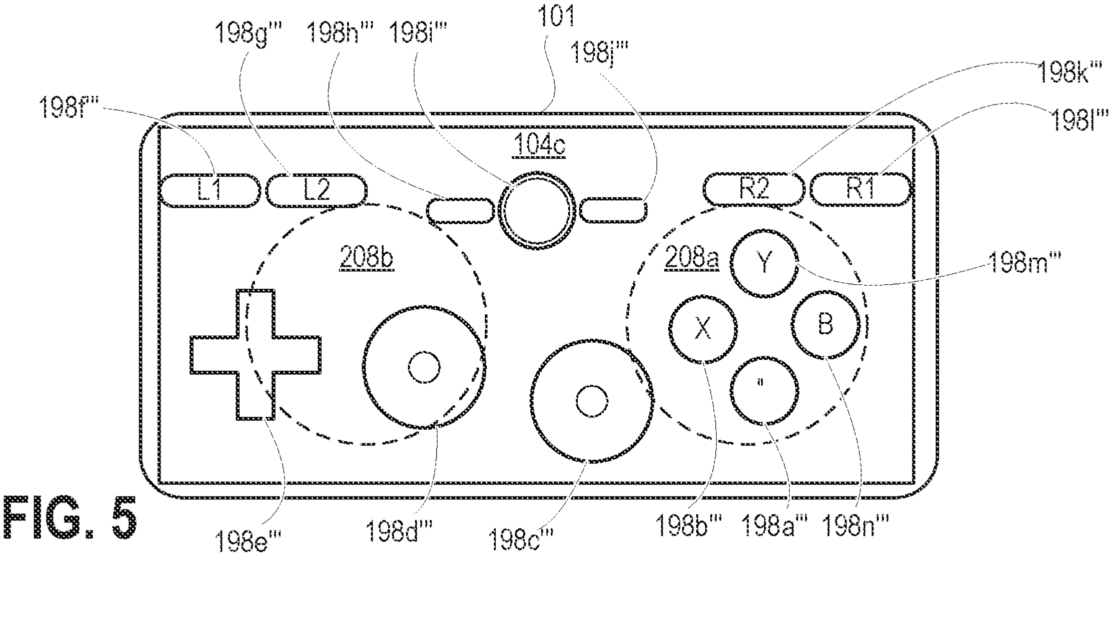
FIG. 5 depicts a third virtual gamepad customized by a user of the electronic device, according to one or more embodiments.

FIG. 5 depicts a third virtual gamepad 104*c* manually customized by user 199 of communication device 101 to increase the size of virtual controls 198*a*''', 198*b*''', 198*m*''', and 198*n*''' that are moved into right thumb area 208*a*. Other virtual controls 198*d*''', 198*e*''', 198*f*''', 198*g*''', 198*h*''', 198*i*''', 198*j*''', 198*k*''', and 198*l*''' are repositioned to reduce a likelihood of inadvertent selection. Third virtual gamepad 104*c* may be downloaded from gaming electronic system 201 (FIG. 2) for use by communication device 101.

Figure 6A:
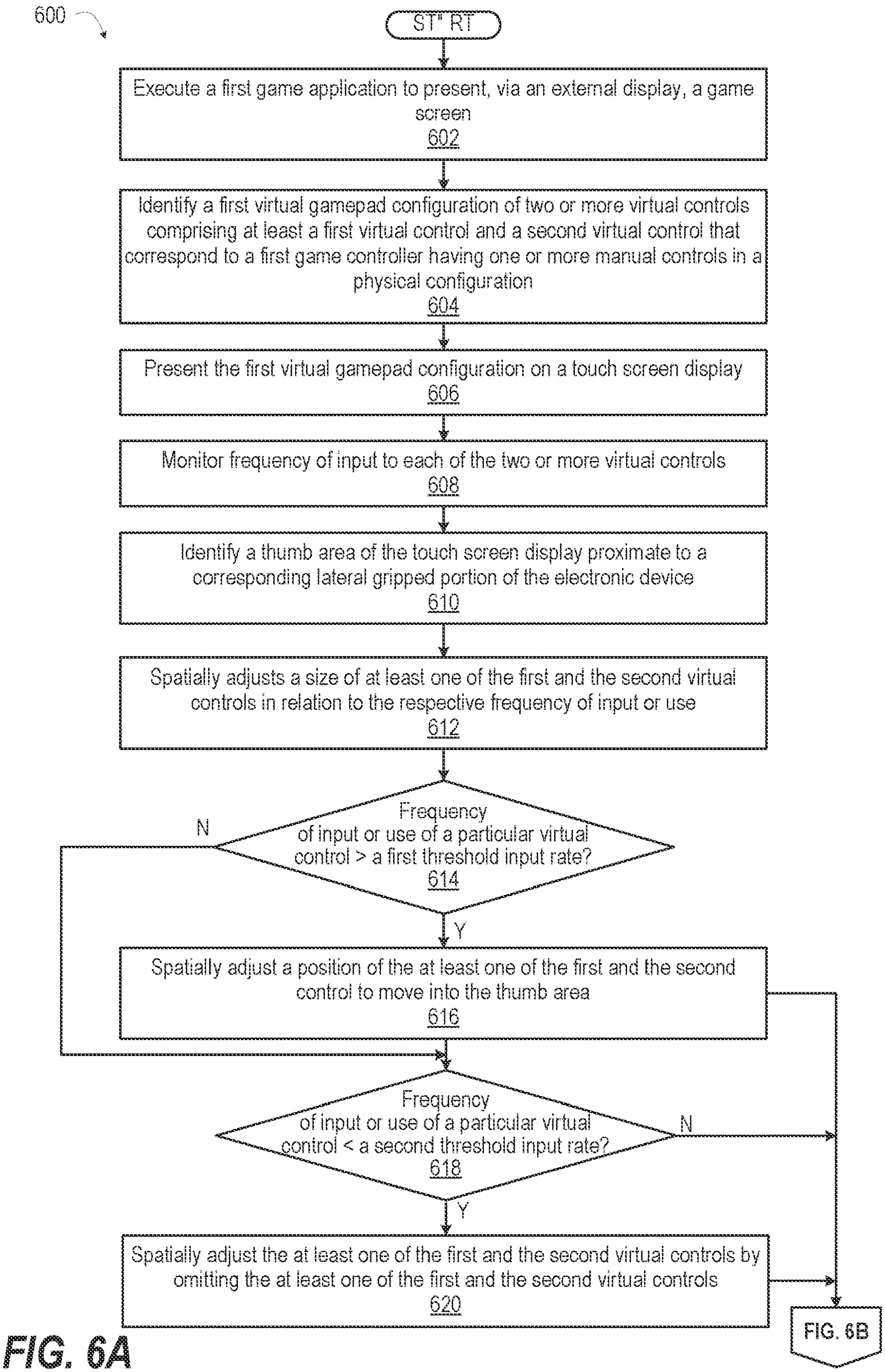
FIGS. 6A-6B (collectively "FIG. 6") are a flow diagram presenting a method of automatically modifying a virtual gamepad presented on a mobile electronic device based on frequency of use of particular controls for a game, according to one or more embodiments.
Figure 6B:
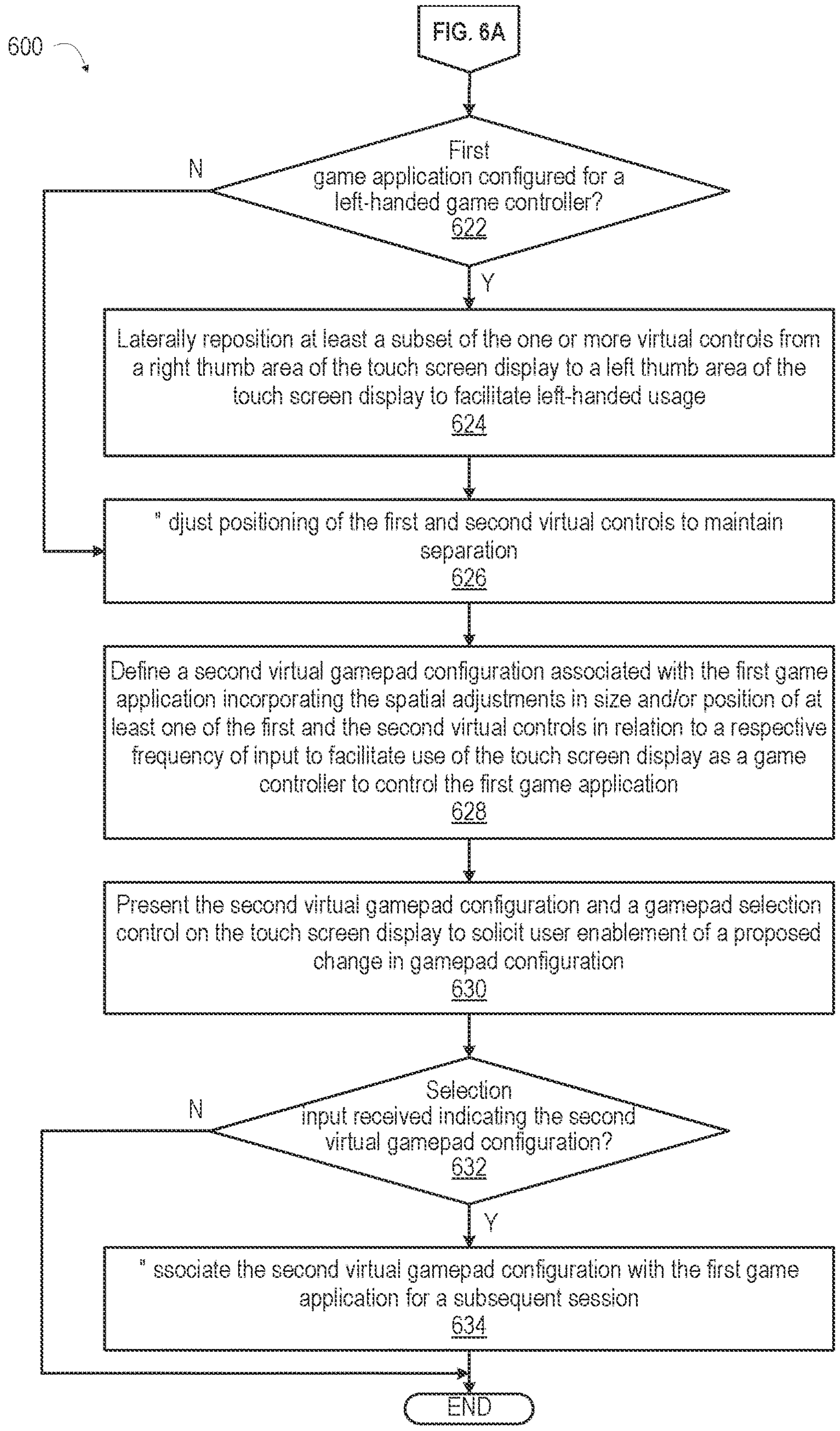
Figure 7:
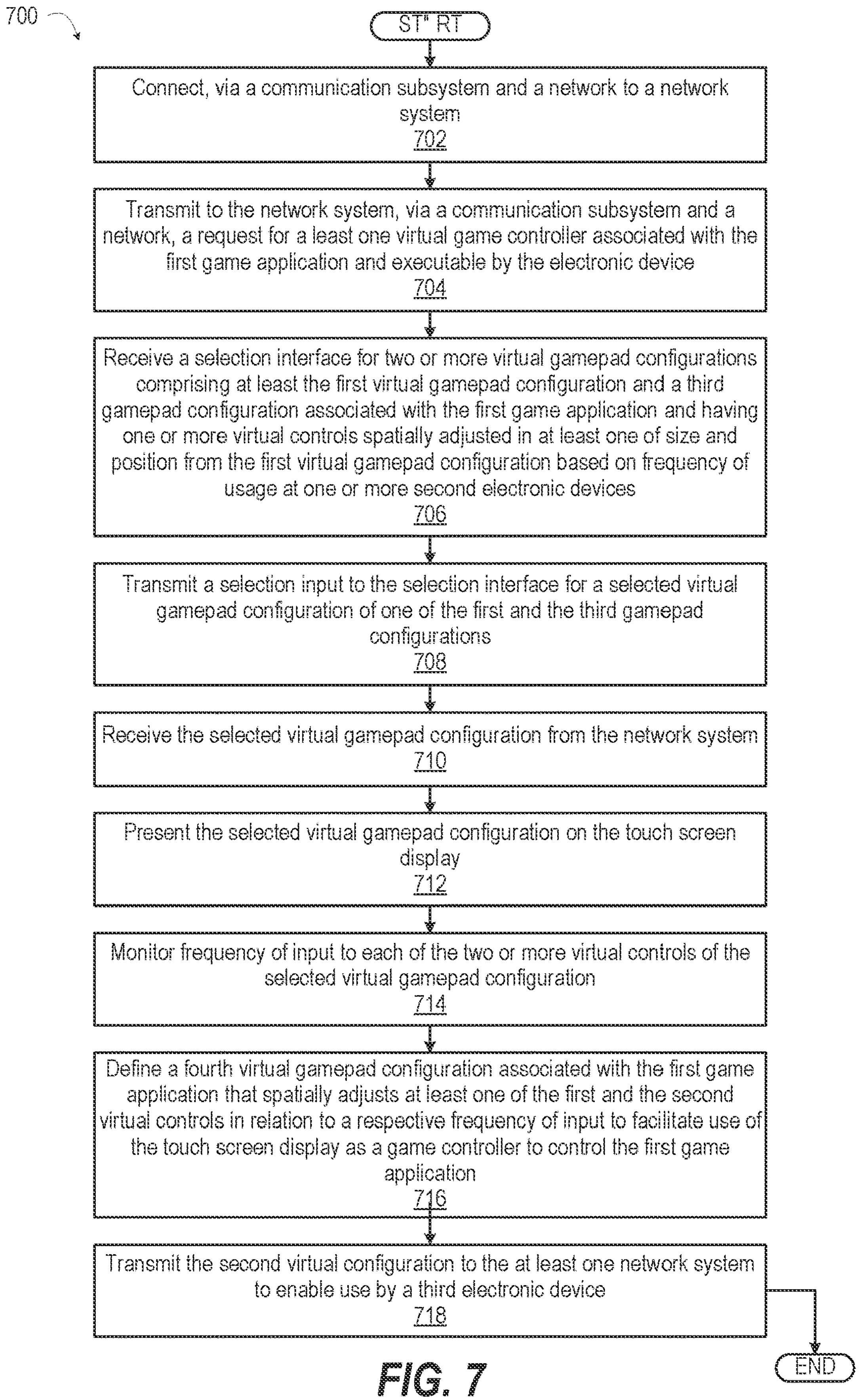
FIG. 7 is a flow diagram presenting a method of sharing, by the electronic device with a network device, automatically customized virtual gamepads, according one or more embodiments.

FIGS. 6A-6B (collectively "FIG. 6") are a flow diagram presenting a method of automatically modifying a virtual gamepad presented on a mobile electronic device based on frequency of use of particular controls for a game. FIG. 7 is a flow diagram presenting a method of sharing, by the electronic device with a network device, of automatically customized virtual gamepads. The descriptions of method 600 (FIG. 6) and method 700 (FIG. 7) are provided with general reference to the specific components illustrated within the preceding FIGS. 1-5. Specific components referenced in method 600 (FIG. 6) and method 700 (FIG. 7) may be identical or similar to components of the same name used in describing preceding FIGS. 1-5. In one or more embodiments, controller 110 (FIG. 1) configures communication device 101 (FIGS. 1 and 3-5) to provide the described functionality of method 600 (FIG. 6) and method 700 (FIG. 7).

With reference to FIG. 6A, method 600 includes executing a first game application to present, via an external display, a game screen (block 602). Method 600 includes identifying a first virtual gamepad configuration of two or more virtual controls comprising at least a first virtual control and a second virtual control that correspond to a first game controller having one or more manual controls in a physical configuration (block 604). Method 600 includes presenting the first virtual gamepad configuration on a touch screen display (block 606). Method 600 includes monitoring frequency of input to each of the two or more virtual controls (block 608). Method 600 includes identifying a thumb area of the touch screen display proximate to a corresponding lateral gripped portion of the electronic device (block 610). In one or more embodiments, method 600 includes spatially adjusting a size of at least one of the first and the second virtual controls in relation to the respective frequency of input or use (block 612). In one or more embodiments, the adjustments may increase the size to a pred-defined maximum size or reduce the size to a pre-defined minimum size. Alternatively, or in addition, adjustment of the size may depend on the frequency of input being outside a pre-defined range.

In an example, use may be defined as falling into four (4) ranges: (i) a first band for frequencies of 0 per total 1000 inputs for all controls; (ii) a second band for frequencies of 25 to 1 per total 1000 inputs for all controls; (iii) a third band includes frequencies of 100 to 26 per total 1000 inputs for all controls; and (ii) a fourth band includes frequencies of 100 to 101 per total 1000 inputs for all controls. Sizes of virtual controls may be assigned based on the ranges: (i) the first band indicates omitting the virtual control; (ii) the second band indicates a reduced size virtual control; (iii) the third band indicates unchanged size of the virtual control; and (iv) the fourth band indicates an increased size virtual control.

Method 600 includes determining whether respective frequency of use of a particular virtual control is greater than a first threshold input rate (decision block 614). In response to determining that the respective frequency of use of the particular virtual control is greater than a first threshold input rate, in one or more embodiments, method 600 includes spatially adjusting a position of the at least one of the first and the second control to move into the thumb area (block 616). Then method 600 proceeds to block 622 (FIG. 6B). The thumb area may be determined based on predetermined default average hand size measurements. Alternatively, the thumb area may be determined based on a configuration procedure performed during a setup of gamepad selection for a particular user.

In response to determining that the respective frequency of use of a particular virtual control is equal to or less than the first threshold input rate in decision block 614, method 600 includes determining whether a corresponding frequency of input of the at least one of the first and the second virtual controls is less than a second threshold input rate (decision block 618). In response to determining that a corresponding frequency of input of the at least one of the first and the second virtual controls is less than a second threshold input rate, in one or more embodiments, method 600 includes spatially adjusting the at least one of the first and the second virtual controls by omitting the at least one of the first and the second virtual controls, (block 620). Then method 600 proceeds to block 622 (FIG. 6B). In response to determining that a corresponding frequency of input of the at least one of the first and the second virtual controls is equal to or greater than the second threshold input rate in decision block 618, method 600 proceeds to block 622 (FIG. 6B).

With reference to FIG. 6B, method 600 includes determining whether the first game application is configured for a left-handed game controller (decision block 622). In response to determining that the first game application is configured for a left-handed game controller, method 600 includes laterally repositioning at least a subset of the one or more virtual controls from a right thumb area of the touch screen display to a left thumb area of the touch screen display to facilitate left-handed usage (block 624). In response to determining that the first game application is not configured for a left-handed game controller in decision block 622 or after block 624, method 600 includes adjusting positioning of the first and second virtual controls to maintain separation (block 626). Method 600 includes defining a second virtual gamepad configuration associated with the first game application incorporating the spatial adjustments in size and/or position of at least one of the first and the second virtual controls, in relation to a respective frequency of input, to facilitate use of the touch screen display as a game controller to control the first game application (block 628). Method 600 includes presenting the second virtual gamepad configuration and a gamepad selection control on the touch screen display to solicit user enablement of a proposed change in gamepad configuration (block 630). Method 600 includes determining whether a selection input is received indicating selection of the second virtual gamepad configuration (decision block 632). In response to determining that the selection input is received indicating selection of the second virtual gamepad configuration, method 600 includes associating the second virtual gamepad configuration with the first game application for a subsequent session (block 634). Then method 600 ends. In response to determining that the selection input is not received indicating the second virtual gamepad configuration in decision block 632, method 600 ends, and the original gamepad is presented during subsequent use of the first game application, with an option to switch to the second virtual gamepad configuration.

With reference to FIG. 7, method 700 includes connecting to a network system, via a communications subsystem and a network (block 702). Method 700 includes transmitting to the network system, via a communications subsystem and the network, a request for a least one virtual game controller associated with the first game application and executable by the electronic device (block 704). Method 700 includes receiving a selection interface for two or more virtual gamepad configurations comprising at least the first virtual gamepad configuration and a third gamepad configuration associated with the first game application and having one or more virtual controls spatially adjusted in at least one of size and position from the first virtual gamepad configuration based on frequency of usage at one or more second electronic devices (block 706). Method 700 includes transmitting a selection input to the selection interface for a selected virtual gamepad configuration of one of the first and the third gamepad configurations (block 708). Method 700 includes receiving the selected virtual gamepad configuration from the network system (block 710). Method 700 includes presenting the selected virtual gamepad configuration on the touch screen display (block 712). Method 700 includes monitoring frequency of input to each of the two or more virtual controls of the selected virtual gamepad configuration (block 714). Method 700 includes defining a fourth virtual gamepad configuration associated with the first game application that spatially adjusts at least one of the first and the second virtual controls in relation to a respective frequency of input to facilitate use of the touch screen display as a game controller to control the first game application (block 716). Method 700 includes transmitting the fourth virtual configuration to the at least one network system to enable download and use by a third electronic device (block 718). Then method 700 ends.

Figure 8:
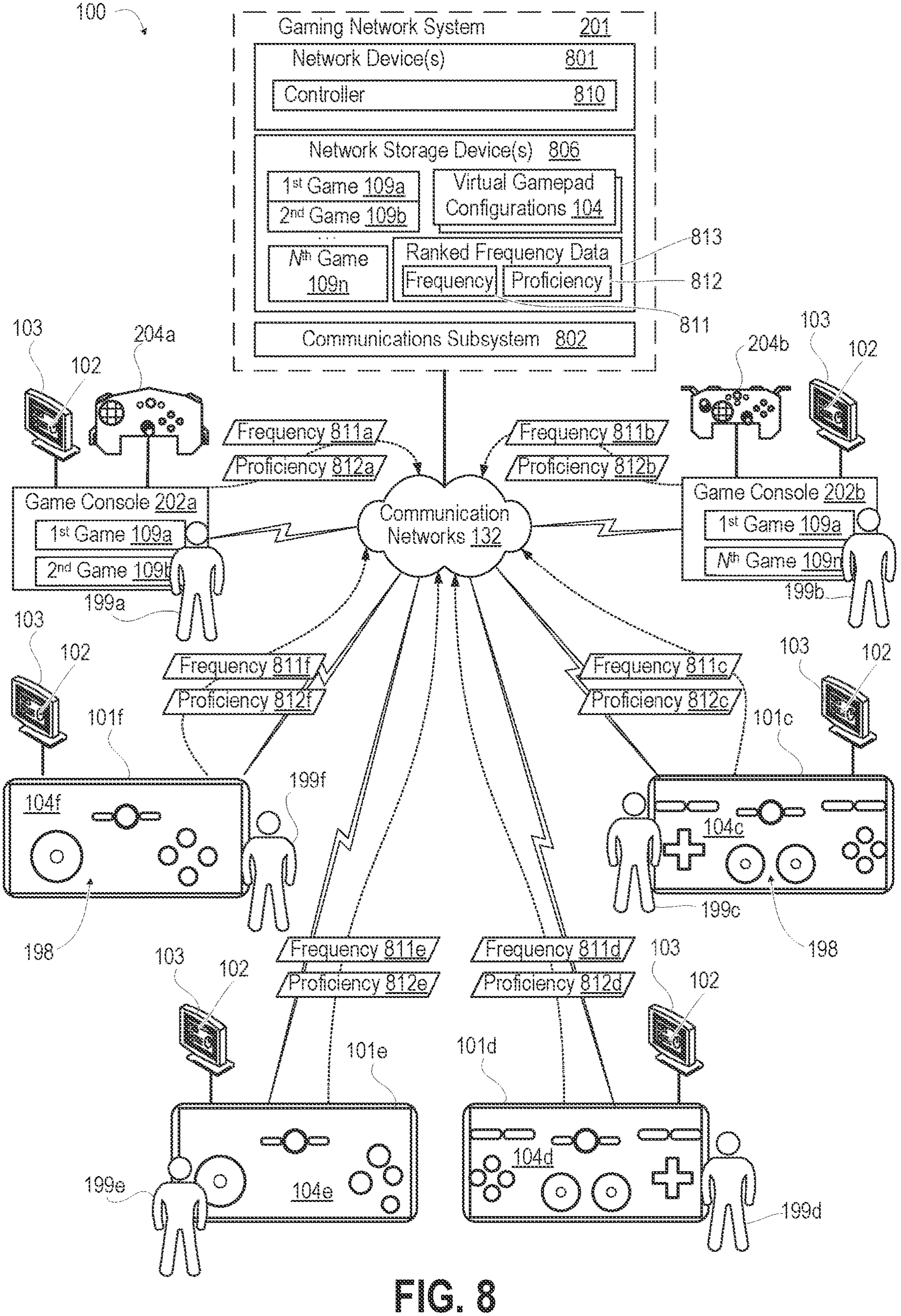
FIG. 8 depicts the communication environment including a gaming network system that aggregates usage data of physical and virtual gamepads for creating and distributing customized virtual gamepads based on the usage data, according to one or more embodiments.

FIG. 8 depicts the communication environment 100 including gaming network system 201, including at least one network device 801, that aggregates usage data of physical and virtual gamepads for creating and distributing modified virtual gamepads based on the usage data. Network device 801 may include all or a subset of similar or identical components as described above for communication device 101 (FIG. 1). In an example, network device 801 is a server or an information handling system or a computer or more than one server. Gaming network system 201 may be implemented as a cloud service. Gaming network system 201 includes communications subsystem 802 that enables gaming network system 201 to connect to communication network 132. Gaming network system 201 includes network memory such as network storage device(s) 806. Controller 810 of gaming network system 201 may reside in one or more of network devices 801. Controller 810 may be a single microprocessor, multiple processors, or distributed computing system. Controller 810 is communicatively connected to communications subsystem 802 and network storage device(s) 806.

Network storage device(s) 806 may store game applications 109 (FIG. 1) such as first game application 109*a*, second game application 109*b*, and Nth game application 109*n* for distributing to game consoles such as first game console 202*a* and second game console 202*b* used respectively by first and second users 199*a* and 199*b*. First physical game controller 204*a* is used by first user 199*a* to interact with first game console 202*a*. Second physical game controller 204*b* is used by second user 199*b* to interact with second game console 202*b*. Controller 810 may also distribute game applications 109*a*, 109*b* and 109*n* to electronic devices 101*c*, 101*d*, 101*e*, and 101*f* used respectively by users 199*c*, 199*d*, 199*e*, and 199*f*. Users 199*a* and 199*b* of physical game consoles 202*a* and 202*b* may be one of users 199*c*, 199*d*, 199*e*, and 199*f* of electronic devices 101*c*, 101*d*, 101*e*, and 101*f*. Game consoles 202*a* and game console 202*b* and electronic devices 101*c*, 101*d*, 101*e*, and 101*f* may obtain first game application 109*a*, second game application 109*b*, and Nth game application 109*n* from other sources, such as obtaining a computer program product containing program code and computer data. Game consoles 202*a* and 202*b* and electronic devices 101*c*-101*f* are communicatively coupled to respective external displays 103 for presenting corresponding game screen 102.

Network storage device(s) 806 stores, in network storage device(s) 806, virtual gamepad configurations ("virtual gamepads 104") that may be distributed to electronic devices 101*c*-101*f*. Virtual gamepads include virtual gamepad 104*c* that is a default version that is not customized and is being presented on touch screen display 106 of electronic device 101*c*. Virtual gamepad 104*d* is a left-handed customized version of virtual gamepad 104*c* and is being presented on touch screen display 106 of electronic device 101*d*. Virtual gamepad 104*e* is an example customized version of virtual gamepad 104*c* and is being presented on touch screen display 106 of electronic device 101*e*. In an example, third virtual gamepad 104*e* is customized by user 199*e* of electronic device 101*e*. In another example, third virtual gamepad 104*e* is customized by electronic device 101*e* based on frequency of inputs by user 199*e*.

To assist network system 201 in distributing virtual gamepads 104, game consoles 202*a* and 202*b* respectively transmit frequency data 811*a* and 811*b* and transmit proficiency data 812*a* and 812*b* to network system 201 via communication network 132. Frequency data 811*a* and 811*b* and proficiency data 812*a* and 812*b* are respectively associated with first and second physical game controller 204*a* and 204*b*. Gaming network system 201 associates, segregates, and stores frequency data 811*a* and 811*b* and proficiency data 812*a* and 812*b* at network storage device(s) 806 as ranked frequency data 813 that includes aggregated frequency data 811 with associated proficiency data 812. In addition, to assist network system 201 in distributing virtual gamepads 104, electronic devices 101*c*-101*f* and 202*b* respectively transmit frequency data 811*c*, 811*d*, 811*e*, and 811*f* and proficiency data 812*c*, 812*d*, 812*e*, and 812*f*, associated respectively with virtual gamepads 104*c*-104*f*, to network system 201 via communication network 132. In an example, virtual gamepad 104*e* may be stored in network storage device(s) 806 for distributing to another electronic device for another user that matches user 199*d* based on matching proficiencies. Gaming network system 201 may present a ranked selection by popularity of virtual gamepads 104 associated with an appropriate proficiency level.

Virtual gamepad 104*d* is another example customized version of virtual gamepad 104*c* and is being presented on touch screen display 106 of electronic device 101*f*. In an example, virtual gamepad 104*f* is customized by network system 201 for electronic device 101*f* based on frequency data 811*f* and proficiency data 812*f* specific to user 199*f* who will use virtual gamepad 104*f*. In another example, network system 201 aggregates and categorizes frequency data 811*a*-811*f* and proficiency data 812*a*-812*f* creating one or more virtual gamepads 104 that include virtual gamepad 104*f*.

According to aspects of the present disclosure, controller 810 associates first game application 109*a* with a first virtual gamepad configuration (virtual gamepad 104*c*) including one or more virtual controls 198. Controller 810 stores, in the network memory such as network storage device(s) 806, one or more customized versions of the first virtual gamepad configuration (virtual gamepad 104*c*). The one or more customized versions include a second virtual gamepad configuration (virtual gamepad 104*f*) having a modified one or more virtual controls. The modification can include at least one of (i) changed in size relative to the first virtual gamepad configuration and (ii) spatially repositioned based on frequency of use of the one or more virtual controls during detected interactions with the first game application by one or more user devices. Game consoles 202*a* and 202*b* and electronic devices 101*c*-101*f* are examples of user devices. Controller 810 transmits, via communication subsystem 802 and communication network 132, at least one of the first virtual gamepad configuration (virtual gamepad 104*c*) and the second virtual gamepad configurations (virtual gamepad 104*f*) to another electronic device for presenting on a touch screen display while executing first game application 109*a* and presenting game screen 102 on external display 103.

Figure 9:
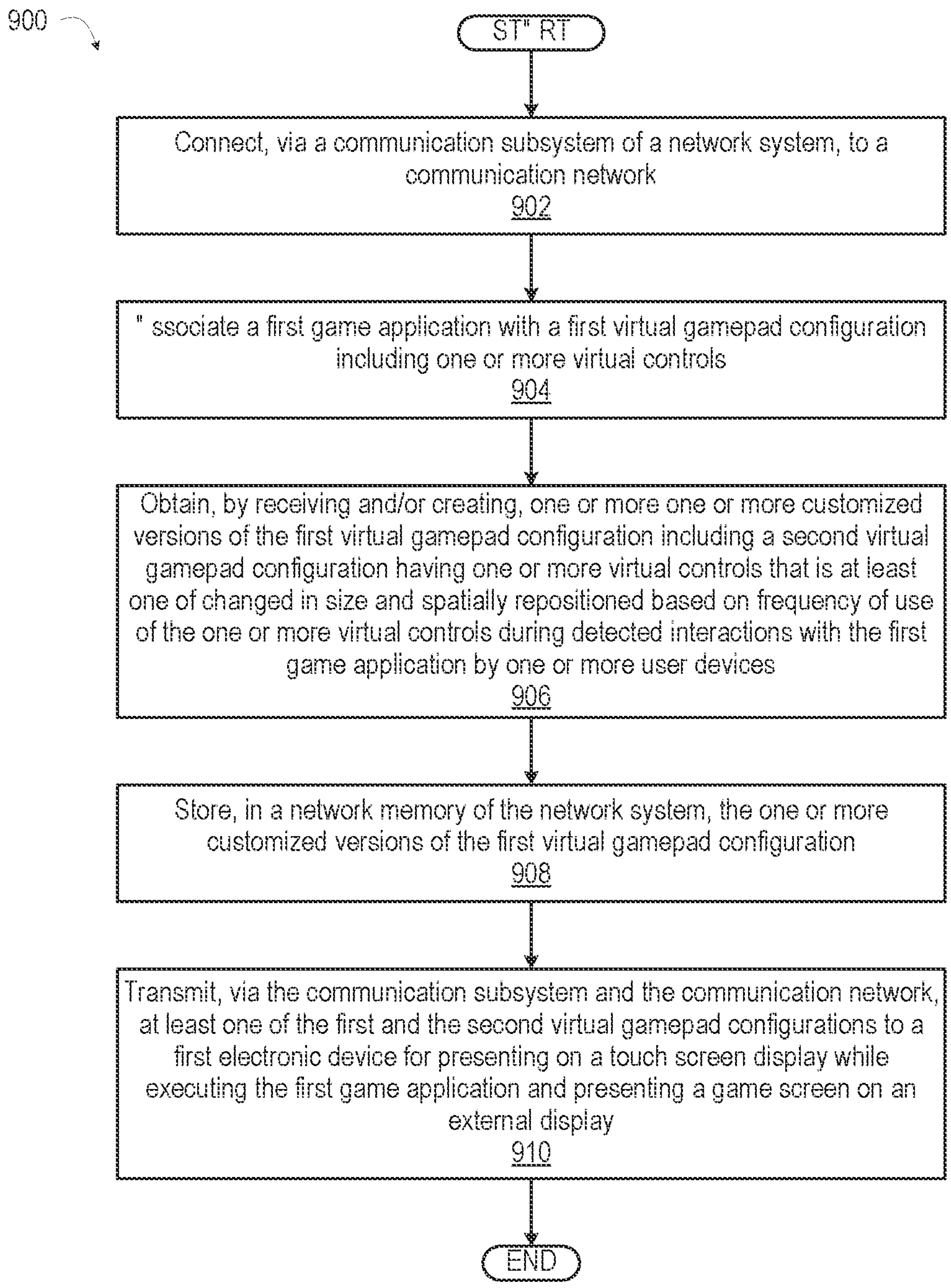
FIG. 9 is a flow diagram presenting a method of distributing customized virtual gamepads, according to one or more embodiments.
Figure 10:
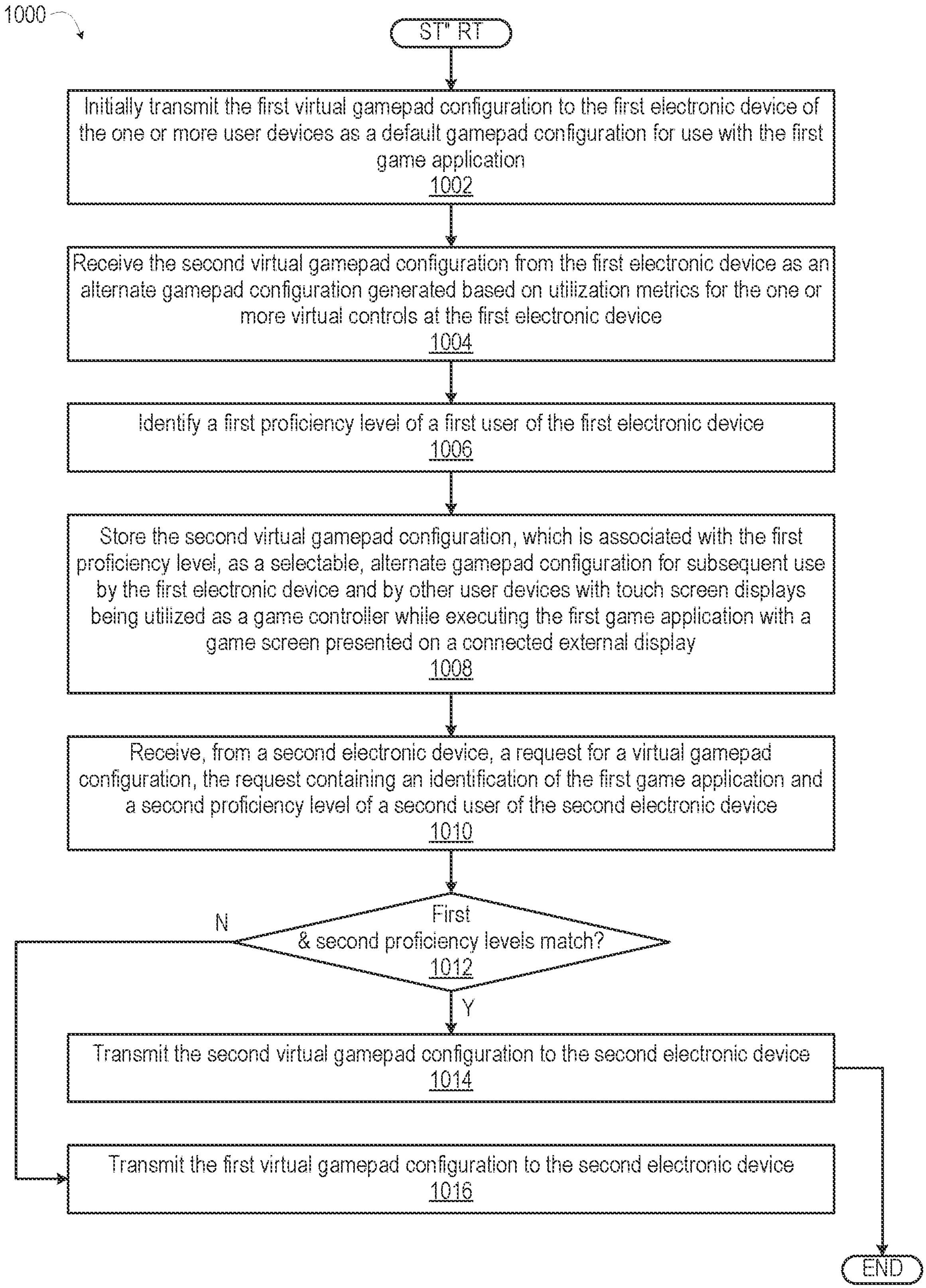
FIG. 10 is a flow diagram presenting a method of categorizing received customized virtual gamepads according to proficiency level and for distributing the customized virtual gamepads that are tracked for popularity and offered according to matched user proficiency levels, according to one or more embodiments.
Figure 11:
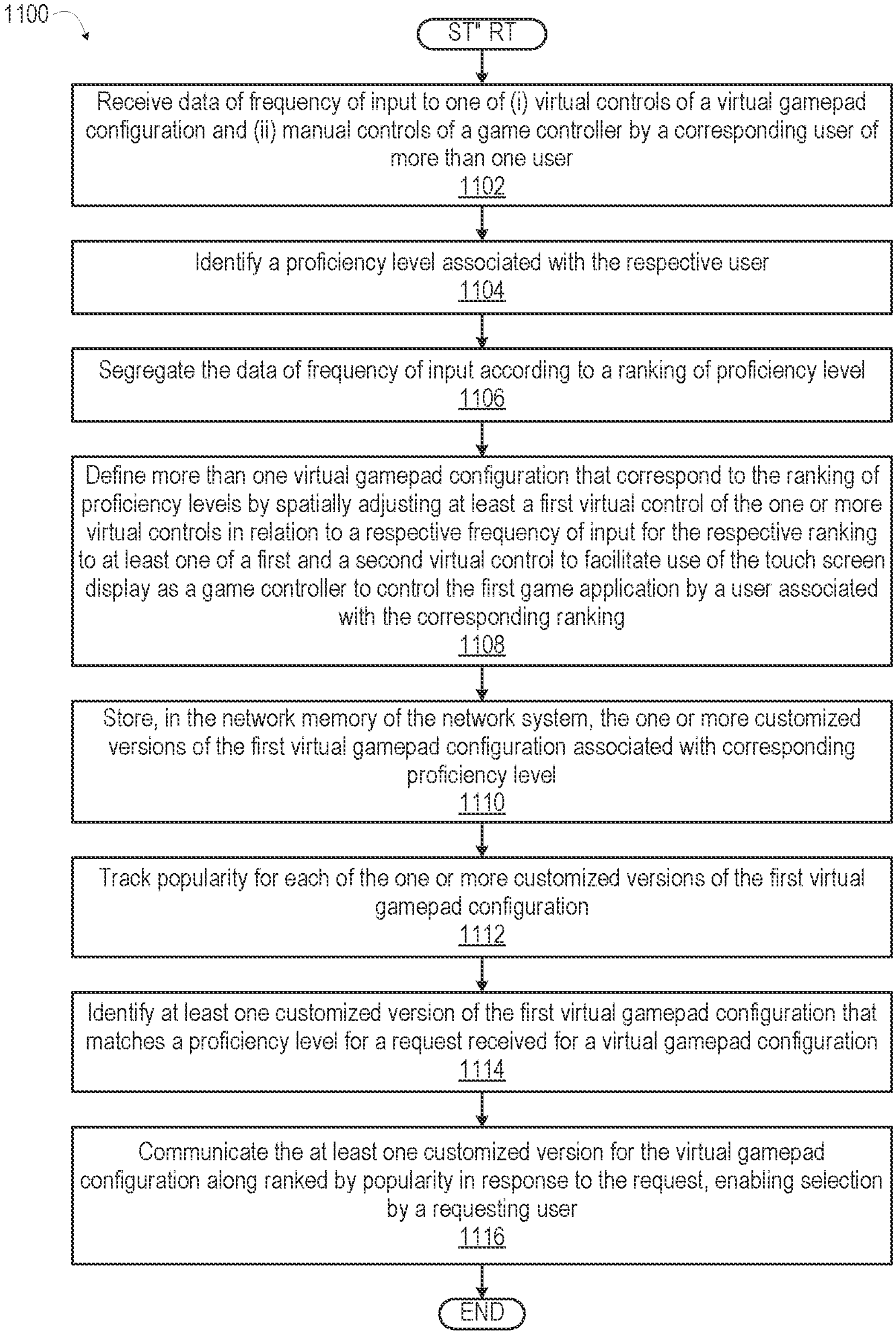
FIG. 11 is a flow diagram presenting a method of automatically aggregating usage data of physical and virtual gamepads categorized by proficiency and creating customized virtual gamepads for different proficiency levels, according to one or more embodiments.

FIG. 9 is a flow diagram presenting method 900 of distributing customized virtual gamepads. FIG. 10 is a flow diagram presenting method 1000 of categorizing received customized virtual gamepads according to proficiency level and for distributing the customized virtual gamepads that are tracked for popularity and offered according to matched user proficiency levels. FIG. 11 is a flow diagram presenting method 1100 of automatically aggregating usage data of physical and virtual gamepads, categorized by proficiency, and creating customized virtual gamepads for different proficiency levels. The descriptions of method 900 (FIG. 9), method 1000 (FIG. 10) and method 1100 (FIG. 11) are provided with general reference to the specific components illustrated within the preceding FIGS. 1-5 and 8. Specific components referenced in method 900 (FIG. 9), method 1000 (FIG. 10) and method 1100 (FIG. 11) may be identical or similar to components of the same name used in describing preceding FIGS. 1-5 and 8. In one or more embodiments, controller 810 (FIG. 8) configures gaming network system 201 (FIGS. 2 and 8) to provide the described functionality of method 900 (FIG. 9), method 1000 (FIG. 10), and method 1100 (FIG. 11).

With reference to FIG. 9, method 900 includes connecting, via a communications subsystem of a network system, to a communication network (block 902). Method 900 includes associating a first game application with a first virtual gamepad configuration that includes one or more virtual controls (block 904). Method 900 includes obtaining, by receiving and/or creating, one or more one or more customized versions of the first virtual gamepad configuration including a second virtual gamepad configuration having one or more virtual controls that is at least one of changed in size relative to the first virtual gamepad configuration and spatially repositioned based on frequency of use of the one or more virtual controls during detected interactions with the first game application by one or more user devices (block 906). Method 1000 of FIG. 10 is an implementation of block 906. With continued reference to FIG. 9, method 900 includes storing, in a network memory of the network system, the one or more customized versions of the first virtual gamepad configuration (block 908). Method 900 includes transmitting, via the communications subsystem and the communication network, at least one of the first and the second virtual gamepad configurations to a first electronic device for presenting on a touch screen display while executing the first game application and presenting a game screen on an external display (block 910). Then method 900 ends.

According to aspects of the present disclosure, method 900 may include connecting, via a communication subsystem of a network system, to a communication network. Method 900 may include associating a first game application with a first virtual gamepad configuration comprising one or more virtual controls. Method 900 may include storing, in network memory, one or more customized versions of the first virtual gamepad configuration. The one or more customized versions include a second virtual gamepad configuration having a modified one or more virtual controls. The modification is at least one of (i) changed in size relative to the first virtual gamepad configuration and (ii) spatially repositioned based on frequency of use of the one or more virtual controls during detected interactions with the first game application by one or more user devices. Method 900 may include transmitting, via the communication subsystem and the communication network, at least one of the first and the second virtual gamepad configurations to a first electronic device. The transmission enables the first electronic device to present the at least one of the first and the second virtual gamepad configurations on a touch screen display while executing the first game application and presenting a game screen on an external display.

In one or more embodiments, method 900 may further include initially transmitting the first virtual gamepad configuration to the first electronic device of the one or more user devices. Method 900 may further include receiving the second virtual gamepad configuration from the first electronic device as an alternate gamepad configuration, which is generated based on utilization metrics for the one or more virtual controls at the first electronic device. Method 900 may further include storing the second virtual gamepad configuration as a selectable, alternate gamepad configuration for subsequent use by the first electronic device and by other user devices with touch screen displays being utilized as a game controller while executing the first game application with a game screen presented on a connected external display. Method 900 may further include transmitting, via the communication subsystem, the second virtual gamepad configuration to a second electronic device of the one or more user devices executing the first game application.

With reference to FIG. 10, method 1000 includes initially transmitting the first virtual gamepad configuration to the first electronic device of the one or more user devices as a default gamepad configuration for use with the first game application (block 1002). In one or more embodiments, method 1000 includes receiving the second virtual gamepad configuration from the first electronic device as an alternate gamepad configuration generated based on utilization metrics for the one or more virtual controls at the first electronic device (block 1004). Method 1000 includes identifying a first proficiency level of a first user of the first electronic device (block 1006). Method 1000 including storing the second virtual gamepad configuration, which is associated with the first proficiency level, as a selectable, alternate gamepad configuration for subsequent use by the first electronic device and by other user devices with touch screen displays being utilized as a game controller while executing the first game application with a game screen presented on a connected external display (block 1008). Method 1000 includes receiving, from a second electronic device, a request for a virtual gamepad configuration, the request containing an identification of the first game application and a second proficiency level of a second user of the second electronic device (block 1010). Method 1000 includes determining whether the first proficiency level associated with the second virtual gamepad configuration matches the second proficiency level associated with the second user (decision block 1012). In response to determining that the first and the second proficiency levels match, method 1000 includes transmitting the second virtual gamepad configuration to the second electronic device (block 1014). Then method 1000 ends. In response to determining that the first and the second proficiency levels do not match, method 1000 includes transmitting the first virtual gamepad configuration to the second electronic device (block 1016). In an example, the first and second proficiency level are an advanced proficiency level whereas the proficiency level of the first virtual gamepad configuration is a beginning proficiency level. In another example, the number of proficiency levels may include more levels than two. Then method 1000 ends.

In one or more embodiments, method 1000 includes performing spatial adjustments to customize a virtual gamepad controller as described above for FIGS. 3, 4, 5, 6A and 6B, except performed by the network system and, as noted above, including additional aggregated frequency data. In an example, method 1000 may include spatially adjusting a size of at least one of a first and a second virtual control in relation to a respective frequency of use. In another example, method 1000 may include spatially adjusting positioning of the first and second virtual controls for ergonomic spacing in response to adjusting at least one of a position and a size of at least one of the first and the second virtual controls. The ergonomic spacing provides sufficient spacing to mitigate inadvertent selection of an adjacent virtual control while limiting spacing intended for one finger to select adjacent virtual controls without having to reposition a corresponding hand grip.

In an additional example, method 1000 may include identifying a thumb area of the touch screen display proximate to a corresponding lateral gripped portion of the electronic device. Method 1000 may further include spatially adjusting a position of at least one of a first and a second virtual control to move a corresponding one of the first and second virtual control into the thumb area in response to the respective frequency of use being greater than a first threshold input rate. In response to determining that the first game application is configured for a left-handed game controller, method 1000 may include laterally repositioning at least a subset of the one or more virtual controls from a right thumb area of the touch screen display to a left thumb area of the touch screen display to facilitate left-handed usage.

With reference to FIG. 11, method 1100 includes receiving data of frequency of input to one of (i) virtual controls of a virtual gamepad configuration and (ii) manual controls of a game controller by a corresponding user of more than one user (block 1102). Method 1100 includes identifying a proficiency level associated with the respective user (block 1104). Method 1100 includes segregating the data of frequency of input according to a ranking of proficiency level (block 1106). Method 1100 includes defining more than one virtual gamepad configuration that correspond to the ranking of proficiency levels. At least a first virtual control of the one or more virtual controls is spatially adjusted in relation to a respective frequency of input for the respective ranking to at least one of a first and a second virtual control. The spatial adjustment facilitates use of the touch screen display as a game controller to control the first game application by a user associated with the corresponding ranking (block 1108). Method 1100 includes storing, in the network memory of the network system, the one or more customized versions of the first virtual gamepad configuration associated with corresponding proficiency level(s) (block 1110).

Method 1100 includes tracking popularity for each of the one or more customized versions of the first virtual gamepad configuration (block 1112). Method 1100 includes identifying at least one customized version of the first virtual gamepad configuration that matches a proficiency level for a request received for a virtual gamepad configuration (block 1114). Method 1100 includes communicating the at least one customized version for the virtual gamepad configuration ranked by popularity in response to the request, enabling selection by a requesting user (block 1116). Then method 1100 ends.

In one or more embodiments, method 1100 may further include identifying, by the game application, a first proficiency level of a first user of the first electronic device based on tracking performance. In an example, the game application defines point levels, time played, milestones, quests, challenges, difficulty levels, etc., that correspond to two or more levels of proficiency. Method 1100 may include identifying a second proficiency level of a second user of the second electronic device that is learned in a similar manner. The proficiency may be related to playing the game with either a physical game controller or a virtual gamepad configuration or be specific to each. Method 1100 may further include transmitting the second virtual gamepad configuration to the second electronic device based at least in part on matching the first and the second proficiency levels. The match may be based on an approximation, such as a level 23 is sufficiently close to a level 28 to be grouped into the same proficiency level. In another example, the match may be based at least in part on the first proficiency level being advanced of the second proficiency level.

In one or more embodiments, method 1100 may further include receiving data of frequency of input to one of (i) virtual controls of a virtual gamepad configuration and (ii) manual controls of a game controller by a corresponding user of more than one users. The data may be raw compilation of control activations or be summarized or be a sampled portion of the use. Tracking may be performed during a setup proficiency test. The proficiency may be a moving average that ignores or attenuates data that is older. Method 1100 may further include identifying a proficiency level associated with the respective user that is maintained at the electronic device or at the network device or system. Method 1100 may include segregating the data of frequency of input according to a ranking of proficiency level. The segregation may include additional categorizations such as age, time spent using a particular physical game controller, proficiency for other games in the same genre (e.g., first person shooter, arcade, racing, etc.) Method 1100 may include defining more than one virtual gamepad configuration that correspond to the ranking of proficiency levels. Each virtual gamepad configuration is defined by spatially adjusting at least a first virtual control of the one or more virtual controls in relation to a respective frequency of input for the respective ranking. The spatial adjustment to at least one of a first and a second virtual control facilitates use of the touch screen display as a game controller to control the first game application by a user associated with the corresponding ranking. With more granular categorization of user demographics and proficiency level, the match may be made by a weighted calculation of multiple factors.

In one or more embodiments, method 1100 may further include transmitting the first virtual gamepad configuration to the first electronic device as a default gamepad configuration for use with the first game application. Method 1100 may further include receiving data of frequency of input to each of the one or more virtual controls during execution of the first game application by the first electronic device. Method 1100 may further include defining the second virtual gamepad configuration that spatially adjusts at least a first virtual control of the one or more virtual controls in relation to a respective frequency of input to the at least the first virtual control to facilitate use of the touch screen display as a game controller to control the first game application.

In one or more embodiments, method 1100 may further include transmitting, via the communication subsystem, the first virtual gamepad configuration to more than one electronic devices including the first electronic device and at least a second electronic device. Method 1100 may further include receiving and combining data of frequency of input to each of the one or more virtual controls during execution of the first game application by at least the first electronic device and the second electronic device of the more than one electronic devices. Method 1100 may further include defining the second virtual gamepad configuration that spatially adjusts at least a first virtual control of the one or more virtual controls in response to the combined data of frequency of input to the at least the first virtual control.

In one or more embodiments, the one or more virtual controls of the first virtual gamepad configuration correspond to a first game controller having one or more manual controls in a physical configuration. Method 1100 may further include receiving and combining data of frequency of input to each of the one or more manual controls of respective first game controllers during execution of the first game application by more than one user devices. Method 1100 may further include combining the data from the one or more manual controls with the data from the one or more virtual controls.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:

a communications subsystem that enables the electronic device to connect to an external display;

a touch screen display;

a memory storing a first game application; and a controller communicatively connected to the external display, the touch screen display, and the memory, and which:

executes the first game application to present, via the external display, a game screen;

identifies a first virtual gamepad configuration of two or more virtual controls comprising at least a first virtual control and a second virtual control;

presents the first virtual gamepad configuration on the touch screen display;

identifies a thumb area of the touch screen display proximate to a corresponding lateral gripped portion of the electronic device;

monitors frequency of input to each of the two or more virtual controls; and defines a second virtual gamepad configuration associated with the first game application that spatially adjusts at least one of the first and the second virtual controls in relation to a respective frequency of input to facilitate use of the touch screen display as a game controller to control the first game application, wherein the controller spatially adjusts a position of the at least one of the first and the second control to move into the thumb area in response to the respective frequency of use being greater than a first threshold input rate.

2. The electronic device of claim 1, wherein the controller spatially adjusts a size of at least one of the first and the second virtual controls in relation to the respective frequency of use.

3. The electronic device of claim 1, wherein the controller spatially adjusts positioning of the first and second virtual controls to maintain separation in response to adjusting at least one of a position and a size of at least one of the first and the second virtual controls.

4. The electronic device of claim 1, wherein the controller:

in response to determining that the first game application is configured for a left-handed game controller, laterally repositions at least a subset of the one or more virtual controls from a right thumb area of the touch screen display to a left thumb area of the touch screen display to facilitate left-handed usage.

5. The electronic device of claim 1, wherein the one or more virtual controls of the first virtual gamepad configuration correspond to a first game controller having one or more manual controls in a physical configuration.

6. The electronic device of claim 1, wherein in defining the second virtual gamepad configuration, the controller spatially adjusts the at least one of the first and the second virtual controls by omitting the at least one of the first and the second virtual controls, in response to a corresponding frequency of input being less than a second threshold input rate.

7. The electronic device of claim 1, further comprising a communications subsystem connectable via a network to a network system, wherein the controller is communicatively connected to the communications subsystem to:

transmits a request for a least one virtual game controller associated with the first game application and executable by the controller;

receives a selection interface for two or more virtual gamepad configurations comprising at least the first virtual gamepad configuration and a third gamepad configuration associated with the first game application and having one or more virtual controls spatially adjusted in at least one of size and position from the first virtual gamepad configuration based on frequency of usage at one or more second electronic devices;

transmits a selection input to the selection interface for a selected virtual gamepad configuration of one of the first and the third gamepad configurations;

receives the selected virtual gamepad configuration from the network system;

presents the selected virtual gamepad configuration on the touch screen display;

monitors frequency of input to each of the two or more virtual controls of the selected virtual gamepad configuration;

defines a fourth virtual gamepad configuration associated with the first game application that spatially adjusts at least one of the first and the second virtual controls in relation to a respective frequency of input to facilitate use of the touch screen display as a game controller to control the first game application; and transmits the second virtual configuration to the network system to enable use by a third electronic device.

8. The electronic device of claim 1, wherein the controller:

presents the second virtual gamepad configuration and a gamepad selection control on the touch screen display to solicit user enablement of a proposed change in gamepad configuration; and associates the second virtual gamepad configuration with the first game application for a subsequent session in response to a selection input to the gamepad selection control selecting the second virtual gamepad configuration.

9. A method comprising:

executing a first game application to present, via an external display, a game screen;

identifying a first virtual gamepad configuration of two or more virtual controls comprising at least a first virtual control and a second virtual control;

presenting the first virtual gamepad configuration on a touch screen display of an electronic device;

identifying a thumb area of the touch screen display proximate to a corresponding lateral gripped portion of the electronic device;

monitoring frequency of input to each of the two or more virtual controls;

defining a second virtual gamepad configuration associated with the first game application that spatially adjusts at least one of the first and the second virtual controls in relation to a respective frequency of input to facilitate use of the touch screen display as a game controller to control the first game application; and spatially adjusting a position of the at least one of the first and the second control to move into the thumb area in response to the respective frequency of use being greater than a first threshold input rate.

10. The method of claim 9, further comprising spatially adjusting a size of at least one of the first and the second virtual controls in relation to the respective frequency of use.

11. The method of claim 9, further comprising spatially adjusting positioning of the first and second virtual controls to maintain separation in response to adjusting at least one of a position and a size of at least one of the first and the second virtual controls.

12. The method of claim 9, further comprising:

in response to determining that the first game application is configured for a left-handed game controller, laterally repositioning at least a subset of the one or more virtual controls from a right thumb area of the touch screen display to a left thumb area of the touch screen display to facilitate left-handed usage.

13. The method of claim 9, wherein the one or more virtual controls of the first virtual gamepad configuration correspond to a first game controller having one or more manual controls in a physical configuration.

14. The method of claim 9, wherein defining the second virtual gamepad configuration comprises spatially adjusting the at least one of the first and the second virtual controls by omitting the at least one of the first and the second virtual controls, in response to a corresponding frequency of input being less than a second threshold input rate.

15. The method of claim 9, further comprising a communications subsystem connectable via a network to a network system, wherein the controller is communicatively connected to the communications subsystem to:

transmitting, via a communications subsystem and a network to a network system, a request for a least one virtual game controller associated with the first game application and executable by the electronic device;

receiving a selection interface for two or more virtual gamepad configurations comprising at least the first virtual gamepad configuration and a third gamepad configuration associated with the first game application and having one or more virtual controls spatially adjusted in at least one of size and position from the first virtual gamepad configuration based on frequency of usage at one or more second electronic devices;

transmitting a selection input to the selection interface for a selected virtual gamepad configuration of one of the first and the third gamepad configurations;

receiving the selected virtual gamepad configuration from the network system;

presenting the selected virtual gamepad configuration on the touch screen display;

monitoring frequency of input to each of the two or more virtual controls of the selected virtual gamepad configuration;

defining a fourth virtual gamepad configuration associated with the first game application that spatially adjusts at least one of the first and the second virtual controls in relation to a respective frequency of input to facilitate use of the touch screen display as a game controller to control the first game application; and transmitting the second virtual configuration to the at least one network system to enable use by a third electronic device.

16. The method of claim 9, further comprising:

presenting the second virtual gamepad configuration and a gamepad selection control on the touch screen display to solicit user enablement of a proposed change in gamepad configuration; and associating the second virtual gamepad configuration with the first game application for a subsequent session in response to a selection input to the gamepad selection control selecting the second virtual gamepad configuration.

17. A computer program product comprising:

a non-transitory computer readable storage device; and program code on the computer readable storage device that when executed by a processor associated with an electronic device, the program code enables the electronic device to provide functionality of:

identifying a first virtual gamepad configuration of two or more virtual controls comprising at least a first virtual control and a second virtual control;

presenting the first virtual gamepad configuration on a touch screen display;

identifying a thumb area of the touch screen display proximate to a corresponding lateral gripped portion of the electronic device;

monitoring frequency of input to each of the two or more virtual controls;

defining a second virtual gamepad configuration associated with the first game application that spatially adjusts at least one of the first and the second virtual controls in relation to a respective frequency of input to facilitate use of the touch screen display as a game controller to control the first game application; and spatially adjusting a position of the at least one of the first and the second control to move into the thumb area in response to the respective frequency of use being greater than a first threshold input rate.

18. The computer program product of claim 17, wherein the program code enables the electronic device to provide functionality of spatially adjusting a size of at least one of the first and the second virtual controls in relation to the respective frequency of use.

* * * * *